US006098397A

United States Patent [19]

Glezer et al.

[11] Patent Number: 6,098,397

[45] Date of Patent: Aug. 8, 2000

[54] COMBUSTOR FOR A LOW-EMISSIONS GAS TURBINE ENGINE

[75] Inventors: Boris Glezer, Del Mar; Stuart A. Greenwood, San Diego; Partha Dutta, San Diego; Hee-Koo Moon, San Diego, all of Calif.

[73] Assignee: Caterpillar Inc., Peoria, Ill.

[21] Appl. No.: 09/093,375

[22] Filed: Jun. 8, 1998

[51] Int. Cl.$^{7}$ .................................. F02G 3/00; F02C 7/20

[52] U.S. Cl. ........................... 60/39.02; 60/39.32; 60/752

[58] Field of Search ................................ 60/39.02, 39.32, 60/752, 753, 754, 756, 757, 760, 758

[56] References Cited

U.S. PATENT DOCUMENTS

| | | | |
|---|---|---|---|
| 710,130 | 9/1902 | Weiss | 60/752 |
| 3,736,747 | 6/1973 | Warren | 60/39.65 |
| 5,575,154 | 11/1996 | Loprinzo | 60/746 |
| 5,596,870 | 1/1997 | Dillard et al. | 60/39.02 |
| 5,636,508 | 6/1997 | Shaffer et al. | 60/39.32 |
| 5,758,504 | 6/1998 | Abreu et al. | 60/39.32 |
| 5,784,876 | 7/1998 | Alkabie | 60/752 |

FOREIGN PATENT DOCUMENTS

| | | |
|---|---|---|
| 0611879 | 8/1994 | European Pat. Off. . |
| 0780638 | 6/1997 | European Pat. Off. . |
| 619251 | 3/1949 | United Kingdom . |
| 636811 | 5/1950 | United Kingdom . |

OTHER PUBLICATIONS

"Variable Geometry Finding Wider Use In Solar Turbine Family" by Larry Sera. Submitted to Gas Turbine World after May 28, 1998.

*Primary Examiner*—Charles G. Freay
*Attorney, Agent, or Firm*—Keith P. Roberson

[57] ABSTRACT

Many government entities regulated emission from gas turbine engines including CO. CO production is generally reduced when CO reacts with excess oxygen at elevated temperatures to form CO2. Many manufactures use film cooling of a combustor liner adjacent to a combustion zone to increase durability of the combustion liner. Film cooling quenches reactions of CO with excess oxygen to form CO2. Cooling the combustor liner on a cold side (backside) away from the combustion zone reduces quenching. Furthermore, placing a plurality of concavities on the cold side enhances the cooling of the combustor liner. Concavities result in very little pressure reduction such that air used to cool the combustor liner may also be used in the combustion zone. An expandable combustor housing maintains a predetermined distance between the combustor housing and combustor liner.

24 Claims, 6 Drawing Sheets

COMBUSTOR FOR A LOW-EMISSIONS GAS TURBINE ENGINE

"The Government of the United States of America has rights in this invention pursuant to Contract No. DE-AC02-92CE40960 awarded by the U.S. Department of Energy".

FIELD OF THE INVENTION

This invention relates generally to a gas turbine engine and more particularly to a combustor liner being suitable for reduced emissions.

BACKGROUND

Current gas turbine engines continue to improve emissions and engine efficiencies. Notwithstanding these improvements, further increases in engine efficiencies will require finer balancing of NOx and carbon monoxide (CO) emissions to meet increasing regulations. Some regulations include limits of 5 ppmv NOx and 10 ppmv CO.

Reducing production of NOx and CO many times require conflicting operating conditions. NOx is an uncertain mixture of oxides of nitrogen generally produced when an excess of atmospheric oxygen oxidizes nitrogen. NOx production typically increases as a flame temperature in a combustor increases. In contrast, CO production increases as the temperature in the combustor decreases. At temperatures above 1800 F. (982 C), CO reacts with excess oxygen to form carbon dioxide (CO2). CO2 is generally considered an unobjectionable emission. Like CO emissions, gas turbine efficiencies generally improve with increasing flame temperatures. However, most materials currently used in gas turbine engines exhibit reduced durability above an upper temperature limit.

Decreasing NOx production in gas turbine engines typically involves reducing the flame temperature. One such example involves injecting water or steam into the combustor. Water injection reduces flame temperatures but may increase wear and corrosion in the turbine. Also, water injection requires additional hardware including water storage tanks, water pumps, and water injectors. Lean premixed combustion attempts to decrease NOx production while maintaining engine efficiencies. A lean premixed combustor premixes a quantity of air and a quantity of fuel upstream of a primary combustion zone. Increasing the quantity of air introduced upstream of the primary combustion zone reduces the flame temperature similar to the introduction of water. By reducing the flame temperature, NOx production also decreases.

Even with the reduced flame temperature, a combustor liner wall near the primary combustion zone requires cooling to increase its durability. A film of cooling air typically flows generally parallel to a hot side of the combustor liner wall in the primary combustion zone. This film protects the combustor liner wall by forming an insulating layer of cool air along the combustor liner wall. However, this film tends to quench the flame along the combustor liner wall. As the flame quenches at the combustor liner wall, CO reactions with excess oxygen to form CO2 retard. Unreacted CO enters an exhaust stream and contributes to the overall emissions from the engine.

U.S. Pat. No. 5,636,508, issued to Shaffer et al. on Jun. 10, 1997 describes a ceramic combustor liner. Ceramic materials generally tolerate higher temperatures than a metal combustor liner. A typical ceramic liner may reach temperatures near 2000 F. (1093 C). In comparison, metal combustor liners typically operate at temperatures up to 1550 F. (843

C). However, many ceramic and metallic combustor liners require cooling to improve their operational life. Metallic liners often cool a cold side (backside) of the combustor liner. Typical methods usually incorporate impingement cooling or protrusions into cooling channel. Both of these methods result in pressure reduction of the air in the cooling channel. With this reduction in pressure, the air from the cooling channel may not be used as combustion air (primary air). Instead, the air from the cooling channel is used as dilution (secondary) air to assist in regulating a gas temperature profile at the combustor outlet.

U.S. Pat. No. 5,575,154, issued to Loprinzo on Nov. 19, 1996, describes a dilution flow sleeve to reduce CO emissions. The dilution flow sleeve improves emissions by increasing the mixing of the film cooling flow along a hot side of the combustor liner wall with a core combustion region. The increased mixing of flow downstream of the primary combustion zone improves the reaction of CO with excess oxygen to form CO2. Air introduced into the dilution flow sleeve enters the combustor downstream of the primary combustion zone. To adequately reduce NOx, cooling air generally must be introduced into the primary combustion zone to reduce flame temperature.

The present invention is directed at overcoming one or more of the problems set forth above.

SUMMARY OF THE INVENTION

In one aspect of the present invention, a gas turbine engine has a combustor. The combustor comprises a combustor cooling shield and a combustor liner positioned therein. The combustor liner has an inlet portion and an outlet portion. The combustor liner is connected with the combustor cooling shield at the outlet portion. The combustor liner has a hot side and a cold side. A cooling channel is formed between the cold side and the combustor cooling shield. The hot side defines a combustion zone therein. A plurality of concavities disposed on the cold side increase convective cooling of said combustor liner.

In another aspect of the present invention, a method for improved cooling of a combustor for a gas turbine engine comprises the steps of: forming an expandable combustor cooling shield; forming a combustor liner having a cold side, an inlet portion, and an outlet portion; positioning the combustor liner inside the combustor cooling shield; forming a cooling channel between the combustor cooling shield and the cold side wherein the cooling channel has a predetermined distance between the cold side and combustor cooling shield; and adjusting the combustor cooling shield to maintain the predetermined distance.

In yet another aspect of the invention, emissions from a gas turbine engine are reduced by directing a volume of air having a first pressure to a combustor having a combustor cooling shield, a combustor liner, and a cooling channel between the combustor cooling shield and the combustor liner. The combustor liner has an inlet portion, an outlet portion, and a plurality of concavities adjacent to the combustor cooling shield. A first portion of the volume of air is diverted into the cooling channel intermediate the inlet and the outlet. The remainder of the volume of air is diverted into the inlet. The first portion is passed over the concavities and back into the inlet portion.

BEST MODE FOR CARRYING OUT THE INVENTION

Figure 1:
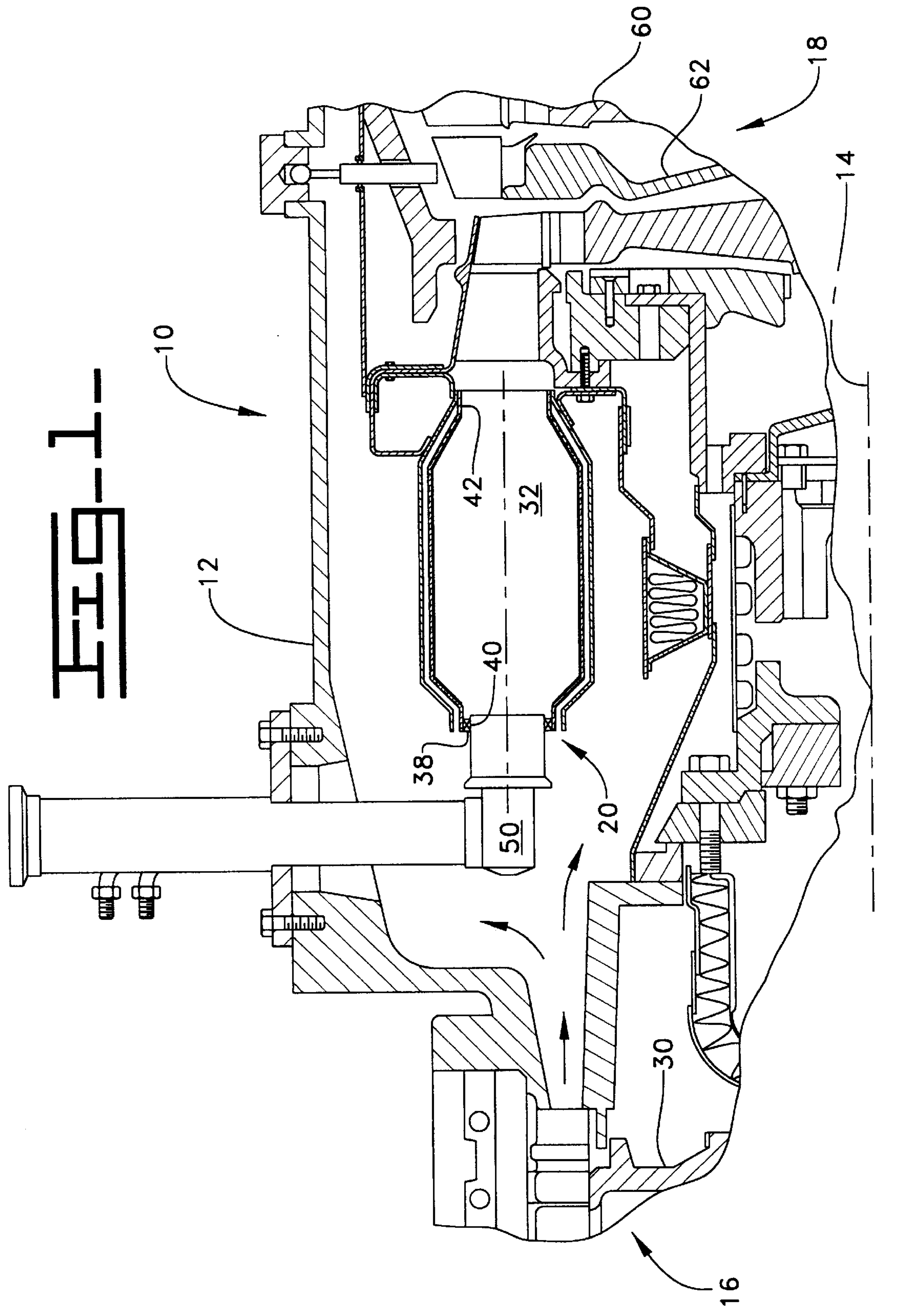
FIG. 1 shows a cross section of a gas turbine engine embodying the present invention.

Referring to FIG. 1, a gas turbine engine 10 has an outer housing 12 having a central axis 14. Positioned in the housing 12 and centered about the axis 14 is a compressor section 16, a turbine section 18 and a combustor section 20 positioned operatively between the compressor section 16 and the turbine section 18.

When the engine 10 is in operation, the compressor section 16, which in this application includes an axial staged compressor 30, causes a flow of compressed air which has at least a part thereof communicated to the combustor section 20. The combustor section 20, in this application, includes an annular combustor assembly 32 being supported in the gas turbine engine 10 by a conventional attaching means. The combustor assembly 32 has an inlet end portion 38 having a plurality of generally evenly spaced openings 40 therein, only one being shown, and an outlet end portion 42. Each of the openings 40 has an injector 50 positioned therein. In this application, the injector 50 is of the premix type in which air and fuel are premixed prior to entering the combustor assembly 32.

The turbine section 18 includes a power turbine 60 having an output shaft, not shown, connected thereto for driving an accessory component such as a generator. Another portion of the turbine section 18 includes a gas producer turbine 62 connected in driving relationship to the compressor section 16.

Figure 2:
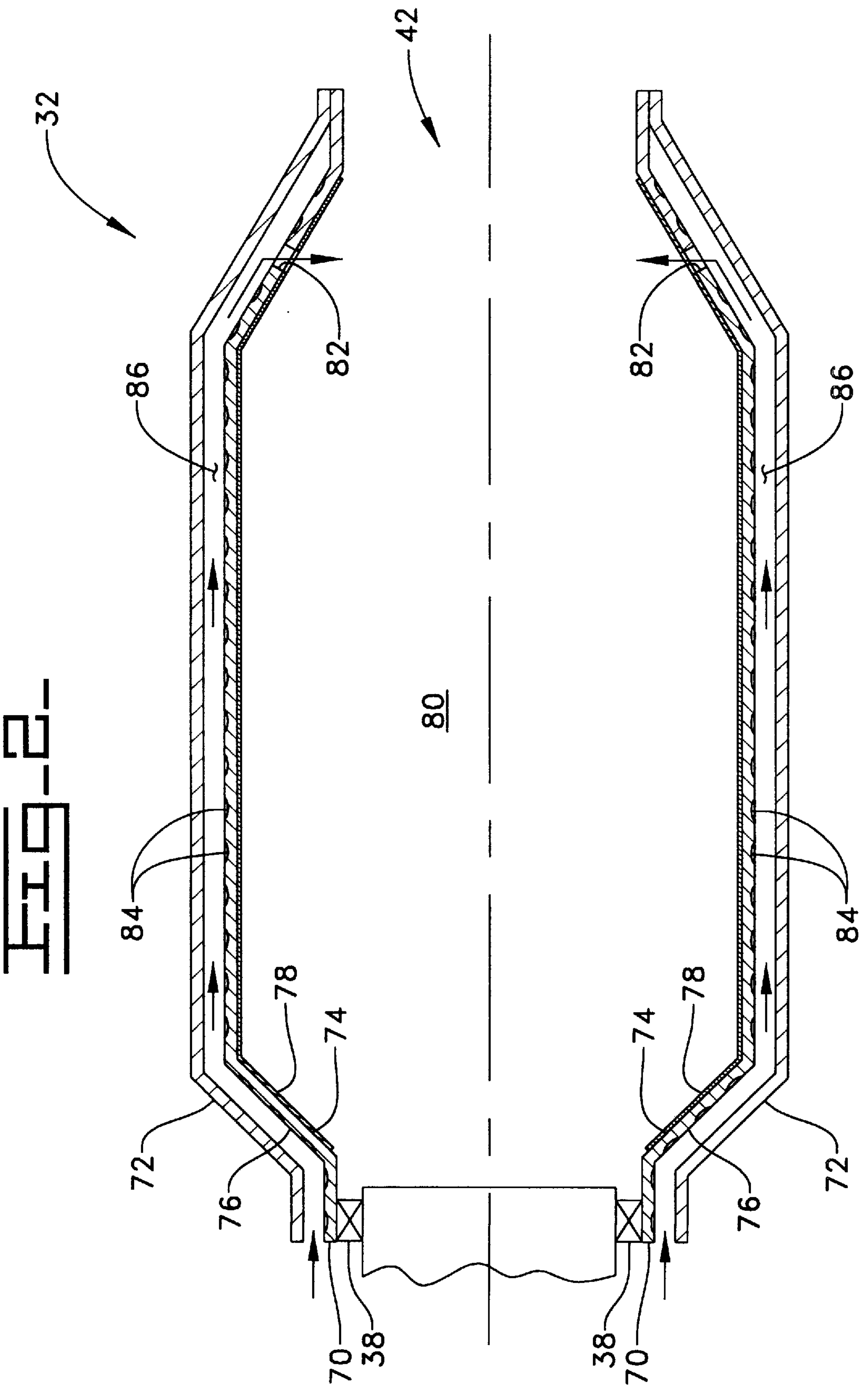
FIG. 2 shows a partially sectioned view of a combustor assembly having a cooling channel.

As best seen in FIG. 2, the annular combustor assembly 32 has a combustor liner 70, a combustor housing 71, and a combustor cooling shield 72. The combustor liner 70 has a hot side 74 and a cold side 76. The combustor liner 70, in this application, is constructed using a metallic material having an operating point of about 1500 F. (843 C) or above, preferably a nickel based alloy like Hastelloy or Inconel. Non-metallic materials having elevated operating points, high temperature strength, and high temperature structural stability, such as a ceramics, provide an equivalent function. Optionally, a thermal barrier coating 78 may be applied to the combustor liner 70. In this application, a zirconia based material is applied using a flame spray method. Other known application methods include plasma spray and physical vapor deposition. The thermal barrier coating 78 is approximately 0.01 inches thick. The combustor liner 70 attaches to the inlet end portion 38 and the outlet end portion 42 in a conventional manner. The hot side 74 of the combustor liner 70, the inlet end portion 38, and the outlet end portion 42 define a combustion chamber. The combustor liner 70 has a plurality of dilution holes 82 near the outlet end portion 42. The cold side 76 has a plurality of concavities 84 being dimples, depressions, or concave recesses.

The combustor housing 72 attaches to the combustor liner 70 near the outlet end portion 42 in a conventional manner.

A cooling channel 86 is formed between the cold side 76 and the combustor housing 72. In this embodiment, the compressor 30 connects to the cooling channel 86 near the inlet end portion 38.

Figure 3:
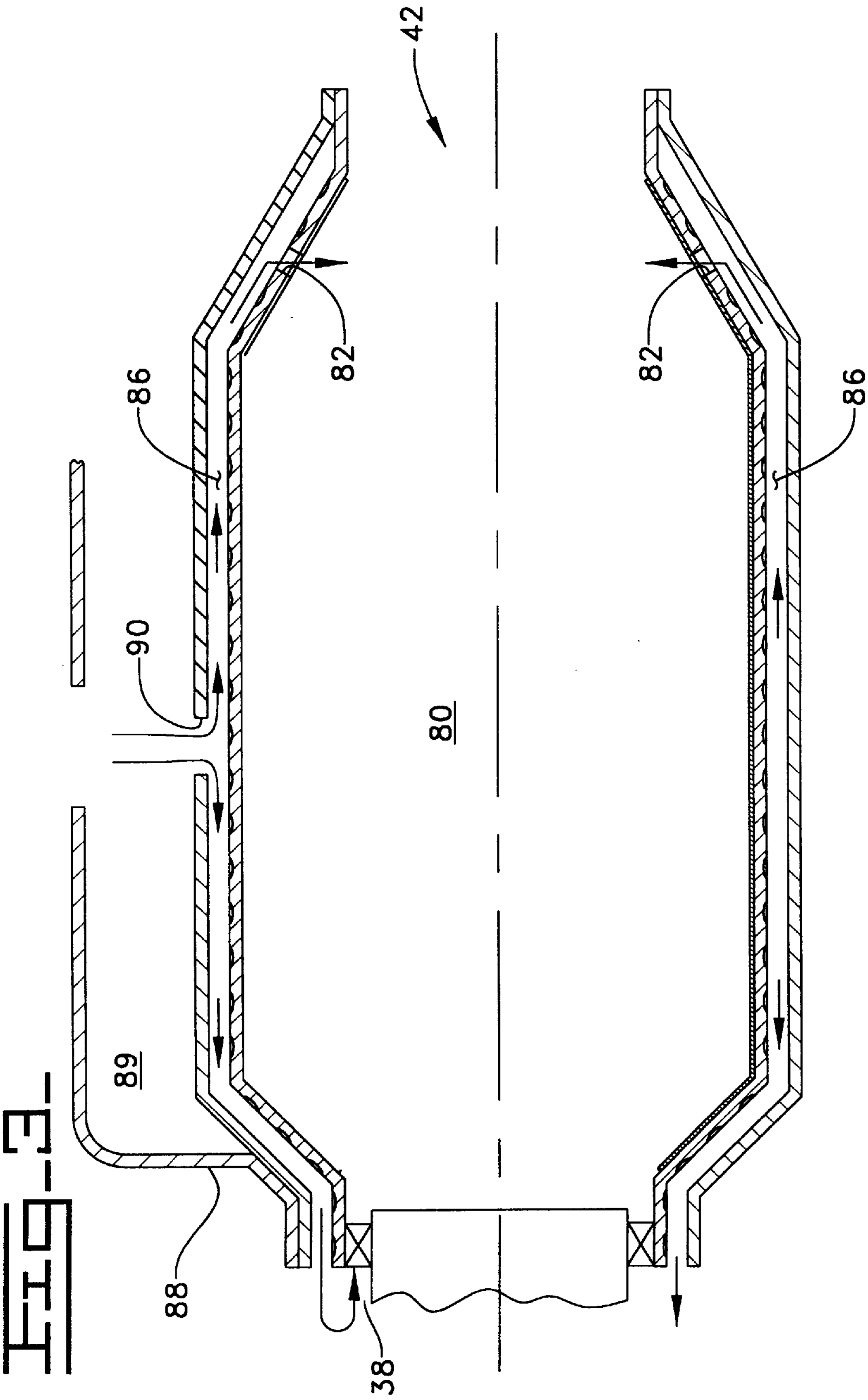
FIG. 3 shows a partially sectioned view of a combustor assembly having a cooling plenum.

Referring to FIG. 3, the compressor 30 connects to cooling channel 86 intermediate the inlet end portion 38 and outlet end portion 42. In this application, a cooling plenum 89 surrounds the combustor cooling shield 72 and connects to the combustor housing near the inlet end portion 38 and the outlet end portion 42. The cooling plenum housing 88 and combustor cooling shield 72 define the cooling plenum 89 therebetween. The compressor 30 is fluidly connected to the cooling plenum 89. A cooling port 90 located intermediate the dilution holes 82 and inlet end portion 38 fluidly connects the cooling plenum 89 with the cooling channel 86. While this application shows the cooling port 90 being located midway between the inlet end portion 38 and the dilution holes 82, the cooling port 90 could be situated anywhere including multiple locations between the dilution holes 82 and inlet end portion 38. The cooling channel 86 further is connected to the inlet end portion 38.

Figure 4:
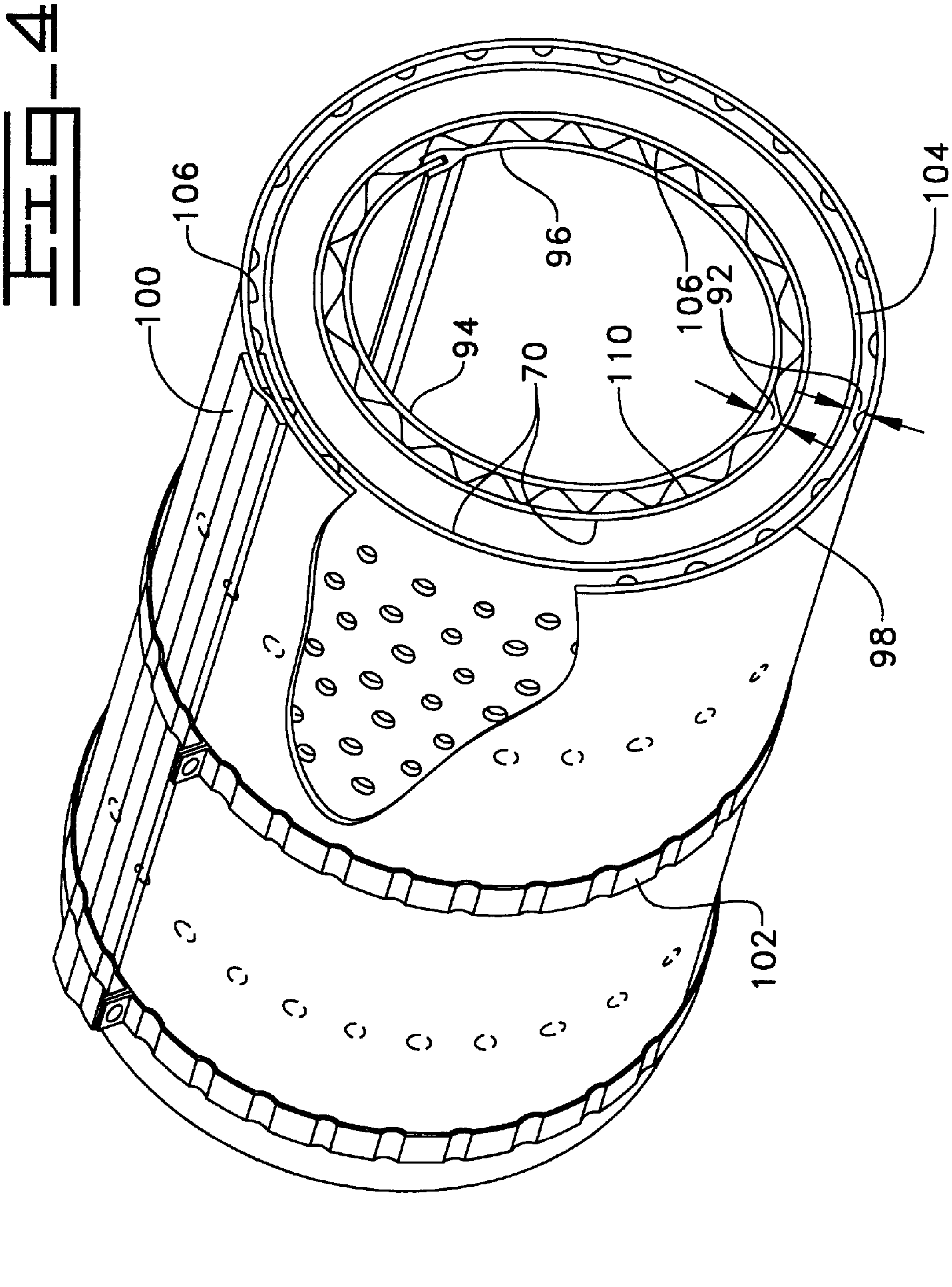
FIG. 4 shows a partially sectioned isometric view of a combustor assembly having an expandable combustor cooling shield.

In FIG. 4, a predetermined distance 92 is formed between the combustor cooling shield 72 and combustor liner 70. In this application, the combustor cooling shield is shown as a first inner circumferential segment 94, a second inner circumferential segment 96, a first outer circumferential segment 98, and a second outer circumferential segment 100. Non-annular type combustors may use outer circumferential segments 98, 100 only. Also, more circumferential segments may be used. A first spring or resilient band 102 connects the first outer circumferential segment 98 and the second outer circumferential segment 100 to form a concentric annulus around an outer diameter 104 of the combustor liner 70. The first outer circumferential segment 98 and second outer circumferential segment 100 have a plurality of resilient radial spacers 106 extending radially inward and contacting the outer diameter 104. A second spring or resilient band (not shown) connects the first inner circumferential segment 94 and the second inner circumferential segment 96 to form a concentric annulus adjacent to an inner diameter 110 of the combustor liner 70. The first inner circumferential segment 94 and second inner circumferential segment 96 have the resilient radial spacers 106 extending radially outward and contacting the inner diameter 110.

Figure 5:
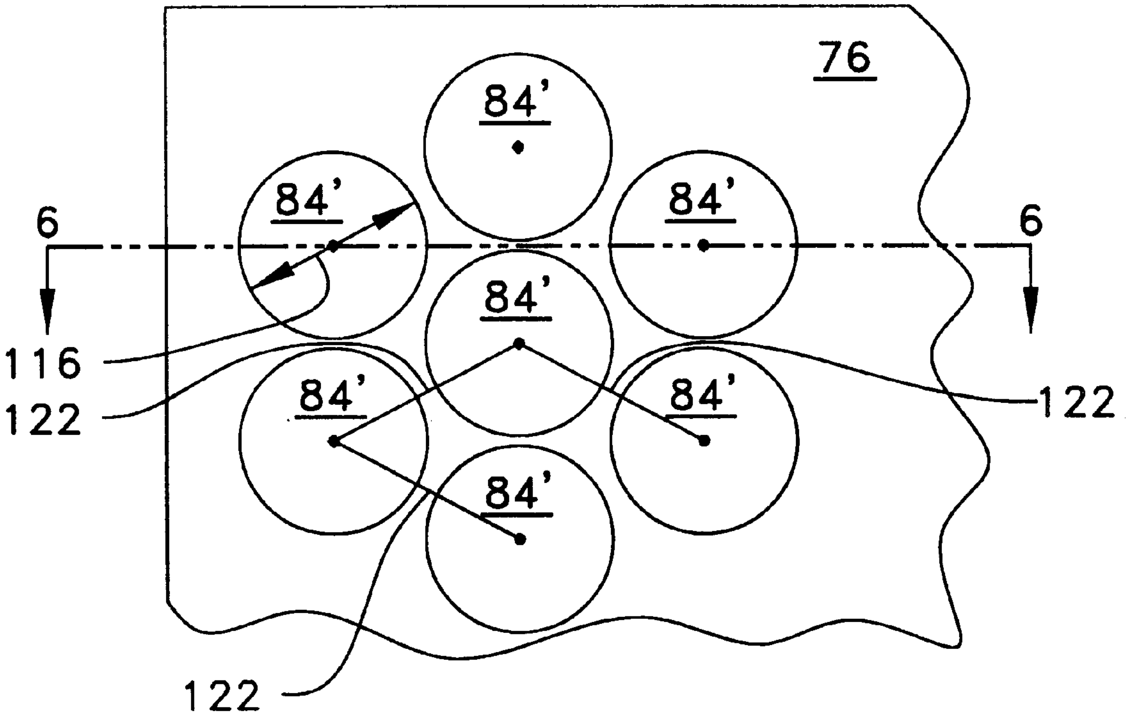
FIG. 5 shows a view taken along line 5—5 of FIG. 4.
Figure 6:
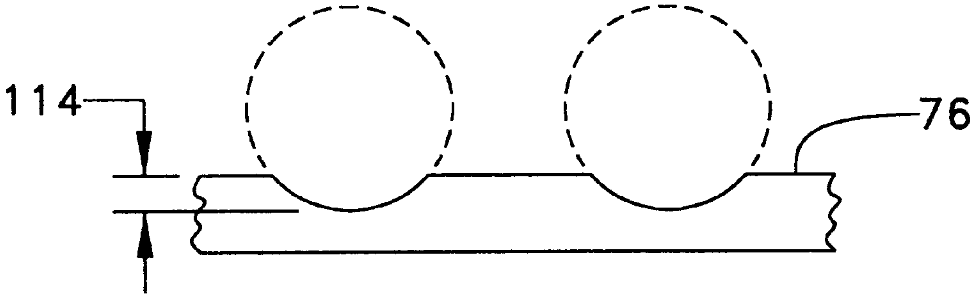
FIG. 6 shows a view taken along line 6—6 of FIG. 5.
Figure 7:
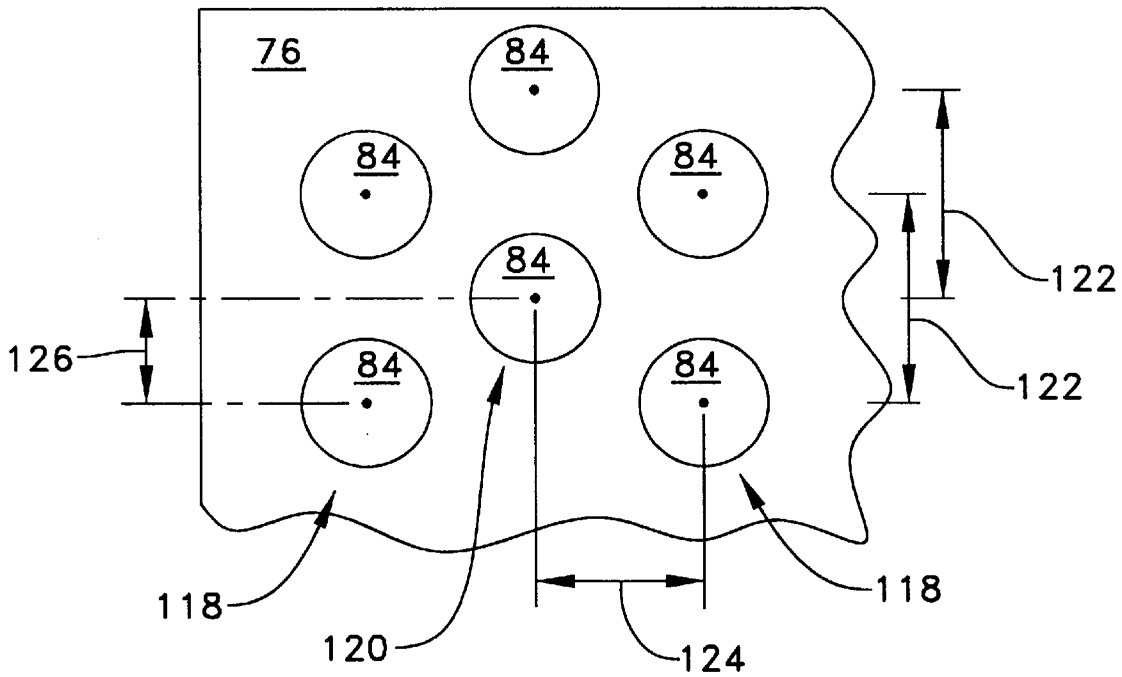
FIG. 7 shows an elevational view of a repeating pattern of a plurality of concavities.
Figure 8:
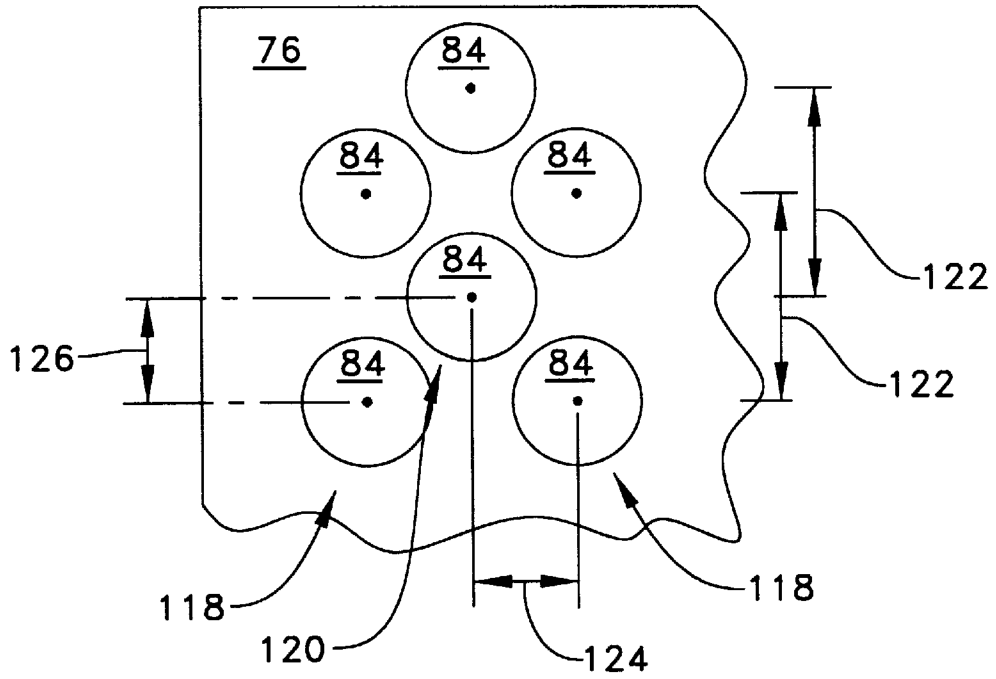
FIG. 8 shows an elevational view of another repeating pattern of the plurality of concavities.

In this application, each concavity 84 has a preestablished concavity depth 114 being about 0.0415 inches (0.105 cm) and a preestablished concavity diameter 116 being about 0.22 inches (0.56 cm) as shown in FIGS. 5 and 6. The concavities 84 are created using a conventional manner, such as machining, forming, molding, etching, pressing, stamping, or casting. The concavities 84 have a predefined concavity spacing 112. The concavity spacing 112 between a center of one concavity 84 to a center of an adjacent cavity 84' is constant and is about 0.275 inches (0.699 cm). FIG. 7 shows a repeating pattern of concavities 84 being arranged into a series of rows, for example, a first rows 118 and a second rows 120. The concavities 84 in the first rows 118 have a vertical concavity spacing 122 of about 0.28 inches (0.71 cm) between concavities in the first row 118. The concavities 84 in the second rows 120 have the vertical concavity spacing 122 of about 0.28 inches (0.71 cm) between concavities in the second row 120. Centers of concavities 84 in the second row have a horizontal offset 124 from the centers of concavities 84 in the first row 118 of about 0.24 inches (0.61 cm). Centers of concavities 84 in the second row 120 further have a vertical offset 126 from centers of concavities 84 in the first row 118 of about 0.14 inches (0.36 cm). FIG. 8 shows the vertical concavity spacing 122 being about 0.44 inches (1.1 cm). The horizontal offset 124 of this embodiment is about 0.16 inches (0.41 cm) with the vertical offset 126 being about 0.22 inches (0.56 cm).

Industrial Applicability

In operation of the gas turbine engine 10, eliminating film cooling greatly reduces the production of CO. Using the combustor section 20 having a cooling channel 86 allows the combustor liner 70 to be cooled without quenching the reaction near the hot side 74 of the combustor liner 70, thus, eliminating film cooling. Furthermore, the concavities 84 increase convective cooling without greatly increasing pressure losses through the cooling channel 86.

The cooling channel 86 receives compressed air from the compressor 30. The concavities 84 increase convective heat transfer by interrupting the growth of thermal boundary layers along the cold side 76. Convective heat flux is a function of wall temperatures of the combustor liner 70, local heat transfer coefficients, and air temperatures of compressed air in the cooling channel 86. Air temperatures of the compressed air depend on the location within the cooling channel. As boundary layers grow, air temperatures farther away from the cold side 76 begin to approach wall temperatures of the cold side 76. Thick boundary layers thermally insulate the cold side 76 from being cooled by compressed air flowing in the cooling channel 86. The concavities 84 interrupt the growth of boundary layers. The concavities 84 form eddies that increase local heat transfer coefficients. As a result, the convective heat transfer flux increases. Eddies also remove boundary layers allowing compressed air to flow from the combustor cooling shield 72 toward the cold side 76. Thermal barrier coatings 78 reduce wall temperatures even further by thermally insulating the hot side 74 from the combustion zone 80. Using thermal barrier coatings 78 allows for higher flame temperatures to further reduce CO production.

Due to the limited pressure drop when using concavities 84, compressed air in the cooling channel 86 may be used to cool the combustor liner 70 and later for introduction upstream of the combustion zone 80. In this application, the compressor 30 delivers compressed air to the cooling plenum 89. Compressed air from the cooling plenum 89 passes through the cooling port 90 into the cooling channel 86. The compressed air is directed both toward the outlet end portion 42 and toward the inlet end portion 38 to cool the combustor liner 70. The compressed air directed toward the outlet end portion 42 passes through the dilution hole 82 into the combustion zone 80. The compressed air directed toward the inlet end portion 38 provides additional air for use in increasing air to be premixed with fuel for introduction into the combustion zone 80.

To further enhance cooling, the segmented radial combustor cooling shield 72 maintains the predetermined distance 92 between the combustor cooling shield 72 and combustor liner 70. The radial spacers 106 press against the combustor cooling shield 72 as the combustor liner 70 expands with increasing temperature. The combustor cooling shield 72 expands in response to the radial force from the radial spacers 106. Expanding the combustor cooling shield 72 maintains the predetermined distance 92 between the combustor cooling shield 72 and the combustor liner 70. By maintaining the predetermined 92 distance the cross sectional area of the cooling channel 86 increases and more compressed air may pass through the increased cross sectional area of the cooling channel 86. The first spring 102 resists the outward pressure exerted by combustor liner 70 on the first outer circumferential segment 98 and second outer circumferential segment 100. The second spring resists inward pressure by the combustor liner 70 on first inner circumferential segment 94 and second inner circumferential segment 92. The first spring 102 and second spring 108 cause the first outer circumferential segment 98, second outer circumferential segment 100, first inner circumferential segment 94, and second inner circumferential segment 96 to return to their original positions as the combustor liner 70 cools.

Other aspects, objects, and advantages of this invention can be obtained from a study of the drawings, the disclosure, and the appended claims.

We claim:

1. A combustor for a gas turbine engine, said combustor comprising:

a combustor cooling shield;

a combustor liner having an inlet portion and an outlet portion, said combustor liner being positioned within said combustor cooling shield, said combustor liner being connected with said combustor cooling shield at said outlet portion, said combustor liner having a hot side and a cold side, said cold side and said combustor cooling shield defining a cooling channel therebetween, said hot side defining a combustion zone therein, said combustion zone being adapted to receive compressed air and a fuel at said inlet portion, said combustion zone being adapted to exhaust a combustion gas into a turbine being in fluid communication with said outlet portion, said cooling channel being.adapted to receive a compressed air stream; and a plurality of concavities disposed on said cold side, said concavities being adapted to increase convective cooling of said combustor liner.

2. The combustor of claim 1 wherein said cooling channel being adapted to receive compressed air intermediate said inlet portion and said outlet portion.

3. The combustor of claim 1 wherein said cooling channel being fluidly connected with said combustion zone proximate said inlet portion.

4. The combustor of claim 1 wherein said combustor liner being a nickel-base alloy.

5. The combustor of claim 1 wherein said hot side being treated with a thermal barrier coating being adapted to thermally insulate said hot side from said combustion zone.

6. The combustor of claim 5 wherein said thermal barrier coating being a zirconia-base material.

7. The combustor of claim 6 wherein said thermal barrier coating being applied by a plasma spray.

8. The combustor of claim 7 wherein said thermal barrier coating being about 0.010 inches thick.

9. The combustor of claim 1 wherein said combustor cooling shield being formed from a plurality of circumferential segments further comprising:

a resilient radial spacer being engagingly connectable with said circumferential segments and said combustor liner, said spacer being adapted to maintain a predetermined distance between said circumferential segments and said combustor liner; and a resilient band being connectable with said combustor cooling shield, said resilient band being adapted to maintain connection between said circumferential segments and said radial spacer, said resilient band being adapted to maintain connection between said spacer and said combustor liner.

10. The combustor of claim 9 wherein said combustor is an annular combustor.

11. The combustor of claim 1 wherein each of said concavities being equally spaced from an adjacent concavity.

12. The combustor of claim 11 wherein said equal spacing being about 0.275 inches.

13. The combustor of claim 1 wherein said concavities extending into said cold side about 0.0415 inches.

14. The combustor of claim 1 wherein said concavities having a diameter of about 0.22 inches.

15. A method for improved cooling of a combustor for a gas turbine engine comprising the steps of:

positioning a combustor liner having a cold side inside a combustor cooling shield with said cold side facing said combustor cooling shield;

establishing a predetermined distance between said combustor cooling shield and said cold side, said predetermined distance, said cooling shield, and said cold side defining a cooling channel; and maintaining said predetermined distance in response to expansion and contraction of said combustor liner.

16. The method for improved cooling of claim 15 further comprising the step of interrupting a growing thermal boundary layer on said cold side.

17. The method for improved cooling of claim 16 wherein said boundary layer growth being interrupted by a plurality of concavities on said cold side.

18. The method for improved cooling of claim 16 wherein said concavities being formed on said cold side by a stamping process.

19. The method for improved cooling of claim 15 wherein said predetermined distance being established by positioning a resilient radial spacer between said cold side and said combustor housing.

20. The method for improved cooling of claim 15 wherein said maintaining said predetermined distance being constraining a plurality of circumferential combustor cooling shield segments with a resilient band.

21. The method for improved cooling of claim 15 wherein said establishing said predetermined distance being forming a plurality of indentations in said combustor cooling shield extending to said cold side.

22. A method for reducing emissions of a gas turbine engine comprising the steps of:

directing a volume of air having a first pressure to a combustor, said combustor having a combustor cooling shield, a combustor liner, and a cooling channel between said combustor cooling shield and said combustor liner, said combustor liner having an inlet portion, an outlet portion, and a plurality of concavities adjacent said combustor cooling shield, said concavities being adapted to retard growth of a thermal boundary layer;

diverting a first portion of said volume of air into said cooling channel intermediate said inlet portion and said outlet portion;

diverting a remainder of said volume of air into said inlet portion;

passing said first portion over said concavities, said first portion convectively cooling said combustor liner; and directing said first portion into said inlet portion, said first portion being at a second pressure wherein said second pressure being about equal to said first pressure.

23. The method for reducing emissions of claim 22 further comprising the step of directing said first portion through a dilution duct proximate said outlet portion.

24. The method for reducing emissions of claim 22 further comprising the step of adjusting said combustor cooling shield to maintain a predetermined distance between said combustor cooling shield and said combustor liner.

* * * * *

UNITED STATES PATENT AND TRADEMARK OFFICE
CERTIFICATE OF CORRECTION

PATENT NO. : 6,098,397
DATED : August 8, 2000
INVENTOR(S) : Boris Glezer et al.

It is certified that error appears in the above-identified patent and that said Letters Patent is hereby corrected as shown below:

On the front page, after [73] Assignee:, delete "Caterpillar Inc., Peoria, Ill." and insert "Solar Turbines Incorporated, San Diego, CA"

Signed and Sealed this

Seventeenth Day of April, 2001

*Attest:*

NICHOLAS P. GODICI

*Attesting Officer*

*Acting Director of the United States Patent and Trademark Office*